(12) United States Patent
Jagadeesan et al.

(10) Patent No.: US 7,383,046 B2
(45) Date of Patent: Jun. 3, 2008

(54) SYSTEM AND METHOD FOR PROVIDING ACCESS POINTS TO ASSIST IN A HANDOFF DECISION IN A WIRELESS ENVIRONMENT

(75) Inventors: Ramanathan T. Jagadeesan, San Jose, CA (US); Chol Su Kang, Fremont, CA (US); Bich T. Nguyen, Los Altos, CA (US); David S. Stephenson, San Jose, CA (US); Richard D. Rebo, North Royalton, OH (US)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 11/051,701

(22) Filed: Feb. 4, 2005

(65) Prior Publication Data
US 2006/0178147 A1   Aug. 10, 2006

(51) Int. Cl.
*H04Q 7/20* (2006.01)
(52) U.S. Cl. .................. 455/436; 455/437; 455/439; 455/440; 455/574
(58) Field of Classification Search ............... 455/436, 455/426, 455.2, 456.6, 554, 555, 437, 439, 455/440, 574; 370/210, 331, 225, 338, 352, 370/329, 401, 389
See application file for complete search history.

(56) References Cited

U.S. PATENT DOCUMENTS

| | | | |
|---|---|---|---|
| 5,519,706 A * | 5/1996 | Bantz et al. ............. | 455/435.2 |
| 5,548,806 A * | 8/1996 | Yamaguchi et al. ........ | 455/441 |
| 5,577,029 A | 11/1996 | Lu et al. ................ | 370/54 |
| 5,887,256 A | 3/1999 | Lu et al. ................ | 455/426 |
| 5,943,332 A | 8/1999 | Liu et al. ............... | 370/342 |
| 6,002,679 A | 12/1999 | Liu et al. ............... | 370/335 |
| 6,016,318 A | 1/2000 | Tomoike ................ | 370/401 |
| 6,141,545 A | 10/2000 | Begeja et al. ........... | 455/417 |
| 6,181,928 B1 | 1/2001 | Moon ................... | 455/415 |
| 6,405,040 B1 | 6/2002 | Liu et al. ............... | 455/435 |
| 6,411,632 B2 | 6/2002 | Lindgren et al. .......... | 370/466 |
| 6,539,237 B1 | 3/2003 | Sayers et al. ............ | 455/555 |
| 6,546,425 B1 | 4/2003 | Hanson et al. ........... | 709/227 |
| 6,611,689 B1 | 8/2003 | Cartigny et al. .......... | 455/461 |
| 6,647,426 B2 | 11/2003 | Mohammed ............. | 709/238 |
| 6,687,360 B2 | 2/2004 | Kung et al. ............. | 379/211.02 |
| 6,748,054 B1 | 6/2004 | Gross et al. ............. | 379/88.12 |
| 6,771,953 B1 | 8/2004 | Chow et al. ............. | 455/417 |
| 6,807,431 B2 | 10/2004 | Sayers et al. ............ | 455/555 |
| 6,826,173 B1 | 11/2004 | Kung et al. ............. | 370/352 |

(Continued)

OTHER PUBLICATIONS

J. Rosenberg, "A Session Initiation Protocol (SIP) Event Package for Registrations," Network Working Group, RFC 3680, 22 pgs., Mar. 2004.

(Continued)

*Primary Examiner*—William Trost
*Assistant Examiner*—Julio Perez
(74) *Attorney, Agent, or Firm*—Baker Botts L.L.P.

(57) ABSTRACT

According to a particular embodiment, a method for assisting in a handoff is provided that includes receiving signaling from one or more access points, which may transmit information to a mobile station. The information may be used to execute a handoff from an enterprise network to a cellular network or from the cellular network to the enterprise network.

17 Claims, 2 Drawing Sheets

U.S. PATENT DOCUMENTS

| | | | |
|---|---|---|---|
| 6,888,808 B2 | 5/2005 | Jagadeesan et al. | 370/328 |
| 6,961,559 B1 | 11/2005 | Chow et al. | 455/414.1 |
| 7,092,710 B1* | 8/2006 | Stoter et al. | 455/437 |
| 2001/0046214 A1 | 11/2001 | Kang | 370/328 |
| 2003/0118015 A1* | 6/2003 | Gunnarsson et al. | 370/389 |
| 2003/0134638 A1 | 7/2003 | Sundar et al. | 455/435 |
| 2003/0134650 A1 | 7/2003 | Sundar et al. | 455/465 |
| 2003/0139180 A1* | 7/2003 | McIntosh et al. | 455/426 |
| 2003/0224795 A1 | 12/2003 | Wilhoite et al. | 455/445 |
| 2004/0002333 A1* | 1/2004 | Neufeld | 455/436 |
| 2004/0037324 A1 | 2/2004 | Heubel et al. | 370/493 |
| 2004/0052231 A1* | 3/2004 | Ramaswamy et al. | 370/338 |
| 2004/0087307 A1 | 5/2004 | Ibe et al. | 455/436 |
| 2004/0127208 A1 | 7/2004 | Nair et al. | 455/420 |
| 2004/0137902 A1* | 7/2004 | Chaskar et al. | 455/436 |
| 2004/0146021 A1 | 7/2004 | Fors et al. | 370/331 |
| 2004/0233840 A1* | 11/2004 | Bye | 370/210 |
| 2004/0259546 A1* | 12/2004 | Balachandran et al. | 455/435.2 |
| 2004/0266426 A1 | 12/2004 | Marsh et al. | 455/426.2 |
| 2005/0090259 A1* | 4/2005 | Jain et al. | 455/439 |
| 2005/0271011 A1* | 12/2005 | Alemany et al. | 370/331 |
| 2005/0271020 A1* | 12/2005 | Thermond | 370/338 |
| 2006/0045069 A1* | 3/2006 | Zehavi et al. | 370/352 |
| 2006/0146834 A1* | 7/2006 | Baker et al. | 370/395.53 |
| 2007/0047504 A1* | 3/2007 | Akram et al. | 370/338 |
| 2007/0093201 A1* | 4/2007 | Hsu et al. | 455/3.04 |

OTHER PUBLICATIONS

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs., Jan. 2003.

Global System for Mobile Communications,"3rd Generation Partnership Project; Technical Specification Group Services and System Aspects; Report on alternative architectures for combining CS Bearers with IMS; Release 6," http://www.3gpp.org, 28 pgs., 2004.

* cited by examiner

SYSTEM AND METHOD FOR PROVIDING ACCESS POINTS TO ASSIST IN A HANDOFF DECISION IN A WIRELESS ENVIRONMENT

TECHNICAL FIELD OF THE INVENTION

The present invention relates generally to network communications and, more particularly, to a system and a method for providing access points to assist in a handoff decision in a wireless environment.

BACKGROUND OF THE INVENTION

Networking architectures have grown increasingly complex in communications environments. In recent years, a series of protocols and architectures have been developed in order to accommodate a diverse group of end users having various needs. Some of these protocols relate to issues associated with handoffs.

As both public and private network systems grow in size and in sophistication, proper routing and efficient management of communication sessions and data flows becomes even more critical. Advances in technology have resulted in the deployment of various types of wireless networks. However, while most of these wireless networks often provide service to adjacent and/or overlapping physical spaces, most cellular and enterprise network protocols are incompatible and suffer from inadequate signaling between the two. In particular, handoff scenarios or signaling involving these two platforms are deficient. Additionally, battery consumption for mobile devices attempting to utilize both network can be less than desirable. Accordingly, the ability to provide an effective mechanism to properly handoff communications for an end user seeking to realize the benefits provided by multiple network environments, while minimizing power consumption, offers a significant challenge to network operators, component manufacturers, and system designers.

SUMMARY OF THE INVENTION

In accordance with some of the teachings of the present invention, techniques for providing optimal power consumption in the context of an effective handoff between circuit-switched cellular and packet-switched wireless networks are provided. According to some embodiments, these techniques enable a mobile station to make an intelligent decision as to whether to handoff a given communication between circuit-switched cellular and packet-switched wireless networks. In particular, these techniques can enable a mobile station to properly coordinate a handoff and to maximize its battery life by minimizing battery consumption.

According to a particular embodiment, a method for assisting in a handoff is provided that includes receiving signaling from one or more access points, which may transmit information to a mobile station. The information may be used to execute a handoff from an enterprise network to a cellular network or from the cellular network to the enterprise network.

In more particular embodiments, the information is provided in one or more periodic beacons or one or more probe responses that are communicated to the mobile station. The method may also include entering into one or more power save operations after receiving the information. The mobile station may interface with a wireless local access network (WLAN) management module that facilitates the handoff.

Embodiments of the invention provide various technical advantages. For example, the architecture of the present invention provides improved decision making capabilities for the mobile station in the context of a handoff between two networks. The configuration of the present invention utilizes multiple access points (e.g. portal access points) to offer a data point that the mobile station can elect to use in making its handoff decisions. Hence, the present invention provides for better handoff performance (i.e. better handoff predictions) for the mobile station.

Additionally, the present invention provides a substantial power savings for a given device (e.g. a mobile station). By tuning to only one radio of the mobile station (e.g. either the 802.11 radio or the cellular network radio), the non-selected radio can be turned OFF, which saves battery life. This advantage is significant and, further, avoids situations where the mobile station continues to toggle (intermittently) between two networks, which consumes an inordinate amount of power. Note that any such operations, whether they relate to switching a given radio OFF, going into a sleep mode, or only waking up at periodic times, are providing advantageous power save operations, which are beneficial to the mobile station.

Certain technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
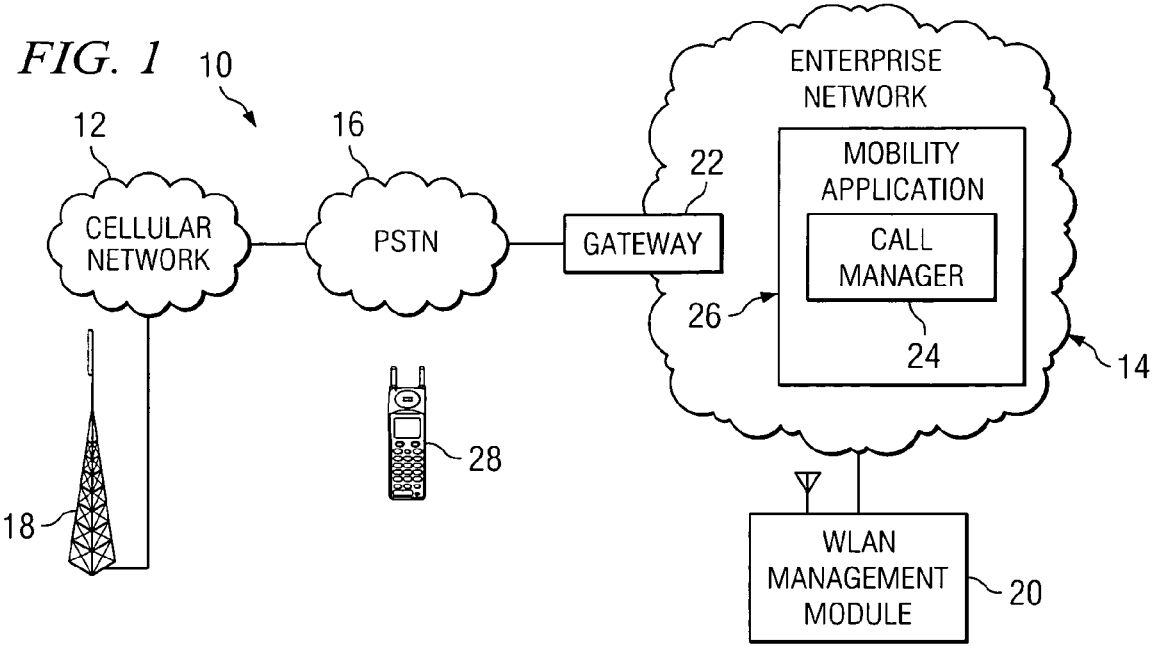
FIG. 1 is a simplified block diagram that illustrates a communication system having elements that support a handoff between cellular and enterprise networks.

FIG. 1 is a simplified block diagram that illustrates a communication system 10 for providing handoff decision support in a network environment. Communication system 10 comprises a cellular network 12 and an enterprise network 14, which are interconnected through a public switched telephone network (PSTN) 16. One or more base stations 18 are coupled to cellular network 12, and one or more wireless local access network (WLAN) management modules 20 are coupled to enterprise network 14. Enterprise network 14 includes a gateway 22, a Call Manager 24 (that is manufactured by Cisco Systems, Inc. of San Jose, Calif.), and a mobility application 26, which can perform one or more operations associated with a handoff server.

Communication system 10 also includes mobile station 28, which may communicate with a remote device through cellular network 12 using base station 18 and/or through enterprise network 14 using WLAN management module 20. The elements of communication system 10 can operate to permit mobile station 28 to maintain a communication session that is handed between cellular network 12 and enterprise network 14. According to particular embodiments, mobility application 26 and/or mobile station 28 utilize one or more of various private branch exchange (PBX) functions to effect handoff between cellular network 12 and enterprise network 14.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Fundamentally, mobile station 28 needs to decide when to perform a handoff between two platforms. In this example, the two platforms are 802.11 (which is part of enterprise network 14) and cellular network 12. This determination is part of the handoff heuristics. One helpful aspect of the heuristics is the ability of mobile station 28 to monitor the signal strength of 802.11. When that signal degrades to a certain point, then mobile station 28 could recognize that it is losing the 802.11 signal such that it should start performing a handoff.

Figure 2:
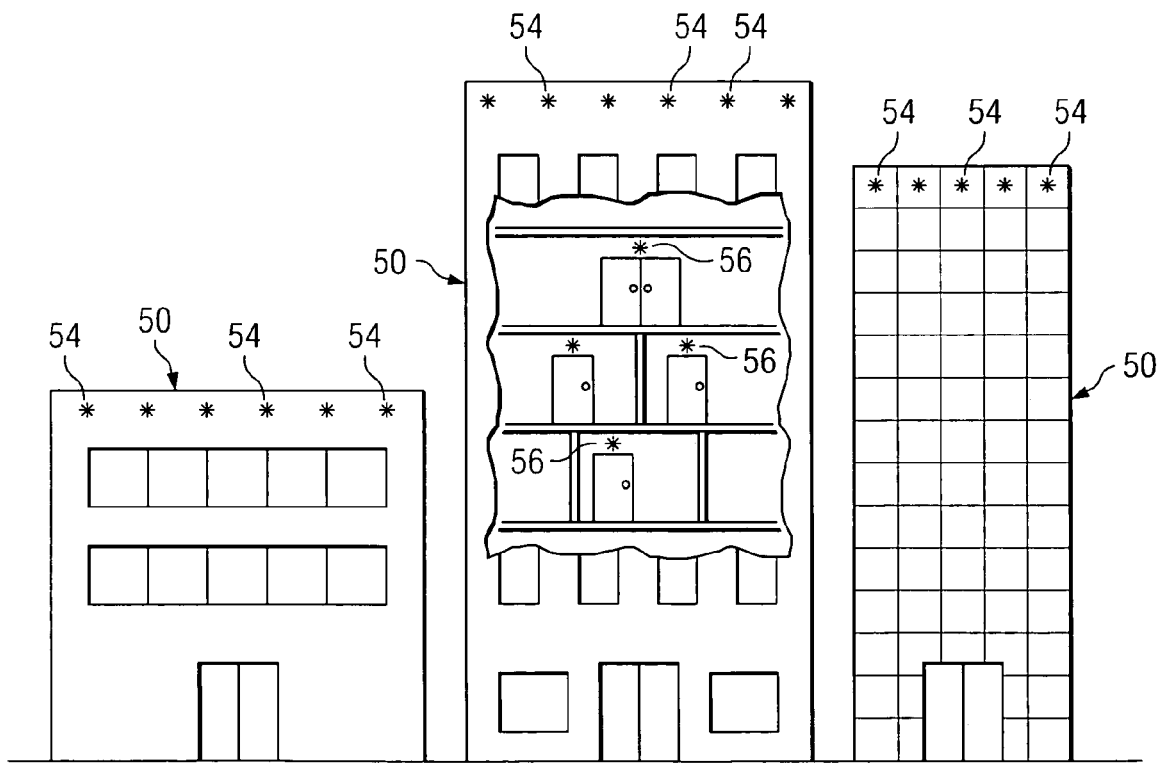
FIG. 2 is a block diagram illustrating a structure that may include one or more access points to assist a mobile station in making a handoff decision.

Communication system 10 addresses this issue, and others, by providing a number of access points (APs), which can give mobile station 28 intelligent hints about when the handoff should be executed. (Note that these APs are illustrated in FIG. 2.) These hints assist mobile station 28 in determining when to perform an appropriate handoff. In offering this assistance, the configuration of the present invention provides for better handoff performance (i.e. better handoff predictions) for mobile station 28.

Thus, a given mobile station may freely roam from one wireless network to another. In accordance with the teachings of the present invention, while mobile station 28 is in the WLAN environment, a portal access point, which was previously defined, is identified or heard. This may be the access point that is serving, for example, doorways to a given building. (Note that details relating to this particular building embodiment are provided below with reference to FIG. 2.) Hence, in any given WLAN environment, there may be thirty interior APs and fifteen edge APs. The portal APs may be the wireless access point, which is actually serving the area associated with, for example, a doorway. In contrast, the edge APs may be the access points that are on the interior of a building and located near the exterior walls. Because of the location of these APs, their radio transmissions can typically be heard outside the building. However, since they are intended to provide radio coverage inside the building and not outside, radio coverage may only intermittent or spotty outside. Thus, it may be undesirable for the mobile station to associate with any of these edge APs because the call could be dropped soon after association due to spotty radio coverage. A preferable roaming approach is to provide the mobile station information on which AP is the portal AP which services the building entrance. Once associated to the portal AP, the mobile station can infer that it is in an area in which radio coverage has been designed to be ubiquitous and of sufficient signal-strength.

All other APs inside this given domain could then be generically positioned based on particular end user tendencies or preferences. For example, a hallway that includes a snack machine could be equipped with several interior APs such that persons who roam into this break station could properly be accommodated by the present invention.

The APs are the actual devices that can connect the wireless devices (e.g. a mobile station) to the rest of the wired IP network in the building. Thus, an intermediary is provided between mobile station 28 and its enterprise network 14. Additionally, a suitable interface (between mobile station 28 and a given AP) is provided by the 802.11 platform (or any other suitable protocol capable of accommodating this signaling).

By placing a numbers of APs near a doorway, if an audible sound is heard on the other end of the phone, then a safe assumption is that the end user is either entering or exiting the room equipped with this AP. Note that each mobile station 28 may be equipped with two radios: one that corresponds to the 802.11 protocol and another that corresponds to cellular network 12. Therefore, by tuning to only one radio of mobile station 28 (either 802.11 or the cellular network), then the non-selected radio can be turned OFF, which saves battery life. This advantage is significant and, further, avoids situations where mobile station 28 continues to toggle (intermittently) between two networks, which consumes an inordinate amount of power. Note that any such operations, whether they relate to switching a given radio OFF, going into a sleep mode, or only waking up at periodic times, are generically referred to as "power save operations" as used herein in this document. Additional details relating to these operations are provided below with reference to corresponding FIGURES.

Turning now to the actual components of FIG. 1, cellular network 12 represents communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28 and PSTN 16. Thus, as illustrated, cellular network 12 may couple to base station 18 to receive and transmit wireless signals to and from mobile station 28.

Enterprise network 14 represents communications equipment, including hardware and any appropriate controlling logic, for interconnecting elements coupled to enterprise network 14. Thus, enterprise network 14 may represent a local area network (LAN), a wide area network (WAN), and/or any other appropriate form of network. Furthermore, elements within enterprise network 14 may utilize circuit-switched and/or packet-based communication protocols to provide for wireline telephony services. For example, elements within enterprise network 14 may utilize Internet Protocol (IP). In addition, elements within enterprise network 14 may utilize wireless standards such as the 802.11 family of wireless standards to provide for wireless telephony services. Note that the 802.11 family of wireless standards includes, among others, 802.11a, 802.11b, and 802.11g. Enterprise network 14 may also utilize interactive voice response (IVR).

Enterprise network 14 may include any number of WLAN management modules 20, gateways 22, Call Managers 24, and other appropriate communications equipment for use in communicating with mobile station 28 and PSTN 16. In the embodiment illustrated, enterprise network 14 includes WLAN management module 20, gateway 22, Call Manager 24, and mobility application 26. WLAN management module 20 represents a generic access point, potentially part of communications equipment, that includes software or hardware and any appropriate controlling logic, for providing wireless access to enterprise network 14.

Thus, WLAN management module 20 can simply be a generic access point, which is part of the network radio management infrastructure. WLAN management module 20 may include information associated with the precise locations of each of the APs. For example, WLAN management module 20 could include building blueprints or floor plans (for every floor of the building) that map out the exact location of the APs. The APs could be manually or automatically designated as portal APs (e.g. egress and ingress) and this configuration could be pushed down to each WLAN management module 20, which is present in the system. WLAN management module 20 could be part of a priority access point or a separate management system. Additionally, WLAN management module 20 could simply be part of infrastructure and, therefore, be provided in a switch, a router, a bridge, or any other suitable component or element. As outlined extensively herein, WLAN management module 20 may utilize one or more of the 802.11 standards. However, any appropriate wireless standard or protocol may be used (e.g. laser technologies, infrared, optics, etc.).

Gateway 22 represents communications equipment, including hardware and any appropriate controlling logic, for interconnecting enterprise network 14 with cellular network 12 and/or PSTN 16. Gateway 22 may be used to convert communications between different communication protocols. For example, gateway 22 may convert communications received from cellular network 12 in SS7 protocol to any of various other protocols that may be used by enterprise network 14, such as protocols associated with the an integrated services digital network (ISDN) standard in the case of circuit-switched trunking and H.323, session initiation protocol (SIP), or other appropriate protocols in the case of IP-based trunking.

Call Manager 24 represents communications equipment or a communications platform, including hardware and any appropriate controlling logic, for providing telephony services over enterprise network 14. For example, Call Manager 24 may support VoIP communications, using any of various protocols such as SIP, skinny (or stateless) client control protocol (SCCP), media gateway control protocol (MGCP), H.323, and/or any other appropriate protocol for VoIP. Furthermore, Call Manager 24 may act as an IP PBX and support PBX functions, such as hold, park, transfer, redirect, and/or other high level and low level call management features.

Mobility application 26 represents a generic server that facilitates a handoff in one embodiment of the present invention, but alternatively could be replaced with any other appropriate device (e.g. a router, switch, bridge, gateway, etc.) that facilitates the operations detailed herein. Mobility application 26 includes any suitable collection of hardware, software, and controlling logic to support a handoff between cellular network 12 and enterprise network 14.

It should also be noted that the internal structure of WLAN management module 20 and mobile station 28 are malleable and can readily be changed, modified, rearranged, or reconfigured in order to achieve their intended operations as they pertain to the handoff function and the AP operations outlined herein. Software and/or hardware may reside in these elements (or in just one) in order to facilitate the teachings of the handoff assistance features of the present invention. Hence, software and/or hardware is provided in mobile station 28, which receives hints associated with a handoff. These hints are provided by an AP, whose transmissions can be heard by mobile station 28.

However, due to their flexibility, these elements (WLAN management module 20 and mobile station 28) may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structures of WLAN management module 20 and mobile station 28 in the context of communication system 10 and, accordingly, they should be construed as such.

PSTN 16 represents communications equipment, including hardware and any appropriate controlling logic, through which cellular network 12 and enterprise network 14 may communicate. PSTN 16 may include switches, wireline and wireless communication devices, and any other appropriate equipment for interconnecting cellular network 12 and enterprise network 14. PSTN 16 may include portions of public and private networks providing network transport services between various geographic areas and networks.

Mobile station 28 represents a mobile device, including hardware and any appropriate controlling logic, capable of communicating with remote devices through cellular network 12 and enterprise network 14 and maintaining communication sessions with remote devices during handoff between cellular network 12 and enterprise network 14. Mobile station 28 may communicate through cellular network 12 using base station 18 and through enterprise network 14 using WLAN management module 20.

In operation, mobile station 28 may initiate and receive telephone calls through cellular network 12 and/or enterprise network 14 to establish communication sessions with remote devices. Note that, as used herein, a remote device refers to any communications device capable of establishing communications sessions with mobile station 28, such as devices located in cellular network 12, enterprise network 14, PSTN 16, or other linked networks. Furthermore, as used herein, a communication session refers to the transfer of voice, video, data, and/or other information between two or more communication devices.

At any point in time, mobile station 28 may determine to handoff a communication session from cellular network 12 to enterprise network 14 or from enterprise network 14 to cellular network 12. This may or may or may not implicate the APs identified herein. For example, after establishing a communication session, mobile station 28 may lose or begin to lose connectivity with base station 18 and/or WLAN management module 20. Signal degradation may occur due to various causes. For instance, mobile station 28 may begin to lose wireless connectivity due to physical movement. When possible, mobile station 28 may switch between using base station 18 and WLAN management module 20 for communications. Moreover, in certain circumstances mobile station 28 may maintain a communication session during handoff between cellular network 12 and enterprise network 14.

A handoff may occur when mobile station 28 travels from an area serviced by cellular network 12 to an area serviced by enterprise network 14. Handoff may also occur in the opposite direction, when mobile station 28 travels from an area serviced by enterprise network 14 to an area serviced by cellular network 12. However, handoff may occur at any other appropriate time. For example, handoff may occur when mobile station 28 is located in an area serviced by both network types due to a predetermined preference of one type of network, due to a spontaneous choice of a user of mobile station 28, or in response to analyzing error rates or other data associated with signaling provided by one or both types of networks. For example, error rates may be associated with signal strengths of base station 18 and WLAN management module 20, and may be dependent upon a location of mobile station 28. Additional details relating to a handoff in the context of the aforementioned APs is provided below with reference to FIG. 3.

Note that communication system 10 represents only one embodiment of a system that supports a handoff between cellular and enterprise wireless networks. Various alternative embodiments are possible. For example, while in the illustrated embodiment enterprise network 14 couples to cellular network 12 through PSTN 16 using gateway 22, various other embodiments may include enterprise network 14 coupling to cellular network 12 in other ways. For example, enterprise network 14 may couple to cellular network 12 using a service provider that supports VoIP. Thus, in alternative embodiments, cellular network 12 and gateway 22 may not be included in communication system 10.

FIG. 2 is a simplified block diagram illustrating a number of structures 50, whereby a selected structure 50 has been illustrated as inclusive of one or more edge APs 54 that are provided near the roof. This positioning is arbitrary, as any of the APs may be provided in virtually any suitable action. Additionally, structure 50 includes one or more portal APs 56, which (in this example embodiment) are provided in the doorframe of selected doorways of structure 50. Again, this selected location is completely arbitrary.

Portal APs 56 may be manually configured (or designed) such that they know they are portal APs. In one example, all APs transmit beacons (sometimes periodically) and provide information about the wireless network to mobile station 28. Thus, within the beacon, APs transmit their abilities to mobile station 28 over the wireless interface. Whenever mobile station 28 hears a given portal AP, and depending on which network mobile station 28 is currently on, mobile station 28 may use the information to trigger a handoff to another network. In other embodiments, this received information may be used for power save operations.

As identified above, intelligence (e.g. via software or hardware) that is resident in mobile station 28 makes use of the information that is periodically transmitted to mobile station 28. Additionally, intelligence provided in WLAN management module 20 is used to interact with mobile station 28. Also, suitable software could be provided in both of these devices to interface with each of the APs. Additional details related to the interaction of these components are provided below in the context of the example of FIG. 3.

While this example includes specific functional components for WLAN management module 20 and mobile station 28, these elements may include any collection and arrangement of components, including some or all of the enumerated functional components, for supporting handoff decisions. Furthermore, WLAN management module 20 may be implemented as a stand-alone device, or aspects of WLAN management module 20 may be distributed among various devices within enterprise network 14. Alternatively, in some embodiments, WLAN management module 20 may be incorporated into mobility application 26 or Call Manager 24.

Figure 3:
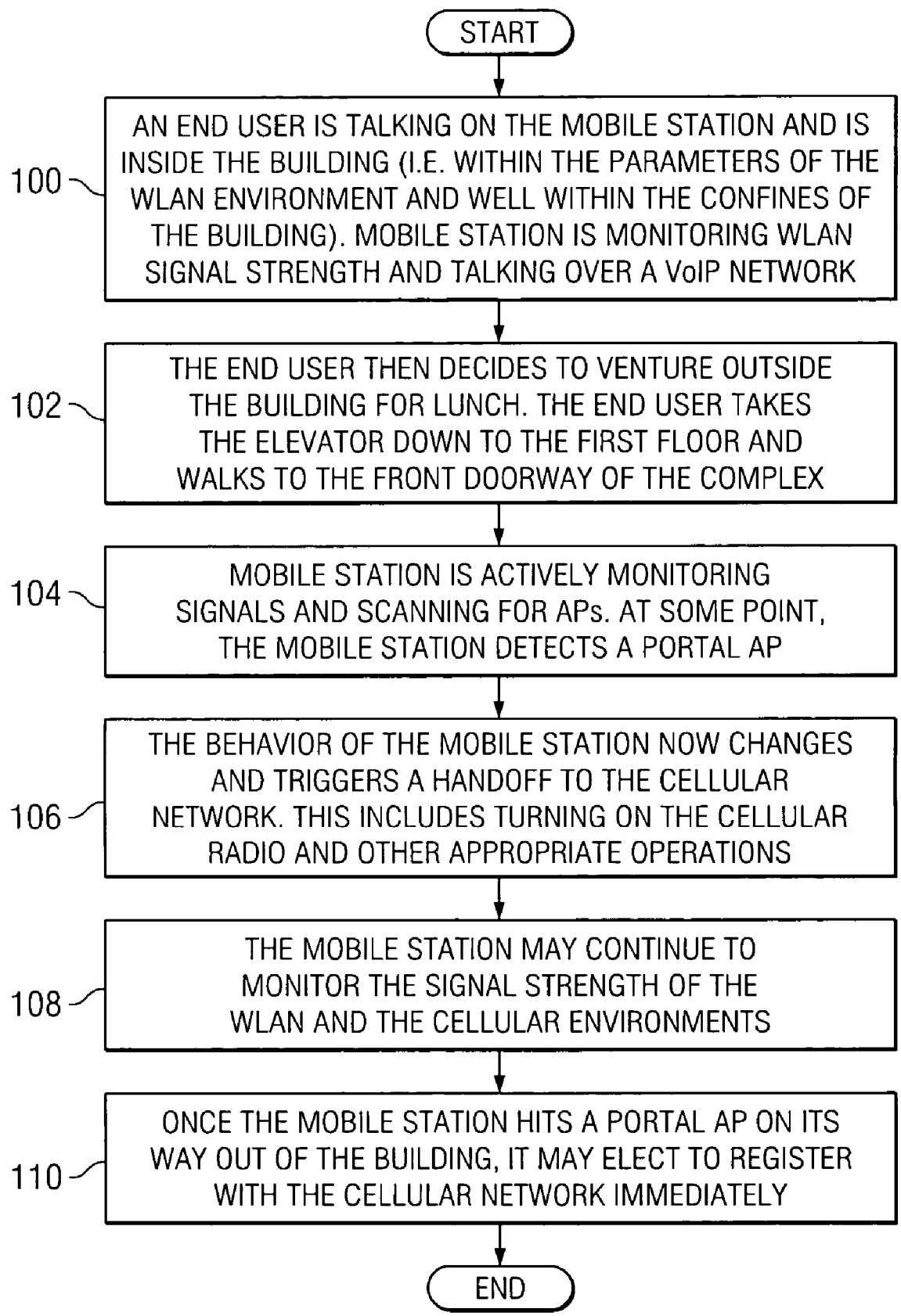
FIG. 3 is a simplified flowchart associated with a method for providing access points to assist in the handoff decision in the communication system.

Turning now to FIG. 3, FIG. 3 is a simplified flowchart associated with a method for providing access points to assist in a handoff decision in communication system 10. In operation of an example flow, consider an example associated with an egress scenario. At step 100, an end user is talking on mobile station 28 and is inside a building (i.e. within the parameters of the WLAN environment and well within the confines of the building). Mobile station 28 is monitoring WLAN signal strength and talking over a VoIP network. At step 102, the end user then decides to venture outside the building for lunch. The end user takes the elevator down to the first floor and walks to the front doorway of the complex.

Step 104 reflects that mobile station 28 is actively monitoring signals and scanning for APs. At some point, mobile station 28 detects a portal AP. In this scenario, the portal AP has advertised itself via periodic transmissions (e.g. beacons). Note that there are other structures that could provide this identification, as beacons are simply one particular platform. The sending of an identifier in a beacon transmission is just one example of a possible identification. For example, probe responses could also be used to achieve this operation. All of the examples allow mobile station 28 to be aware of the surrounding APs to which it is listening, and all such permutations clearly within the broad scope of the present invention.

In this example, when the end user is in the middle of the structure, only the interior APs are heard by mobile station 28. Once the end user begins to move toward the exit, the portal AP associated with the doorway is picked up or heard. At step 106, the behavior of mobile station 28 now changes and triggers a handoff to cellular network 12. This includes turning ON the cellular radio and other appropriate operations. Note that mobile station 28 may continue to monitor the signal strength of the WLAN and the cellular environments at step 108. However, the purpose of this portal AP is to provide another data point that mobile station 28 can use in order to decide whether or not a handoff is appropriate. Hence, the handoff decision is based on a number of parameters, whereby any signal received from a given AP is not necessarily decisive for mobile station 28. Mobile station 28 may make its handoff determination based on any number of characteristics: such a determination being configurable.

Note that once mobile station 28 hits a portal AP on its way out of the building, it may elect to register with cellular network 12 immediately. This is illustrated by step 110. Similarly, mobile station 28 may be configured such that, once it associates with a portal AP, it registers with that cellular network. Another configuration option could relate to a scenario where mobile station 28, after associating with a portal AP, monitors signal strength such that when the signal strength drops below a given threshold, then mobile station 28 opts to register.

In operation of an example embodiment in the opposite direction, an end user of mobile station 28, who is on cellular network 12, may be approaching a building. As the end user moves closer to the building, the edge APs, which are present on the building, may be heard by mobile station 28. These edge APs are not necessarily the 'correct' AP to which mobile station 28 should associate or link. Indeed, these edge APs may provide hints about which are the right portal APs for mobile station 28 for purposes of association.

Once mobile station 28 picks up an appropriate portal AP, then mobile station 28 may then choose to associate with that portal AP and execute a handoff. In this case, the handoff would be from cellular network 12 to the WLAN network (i.e. the enterprise network). Here too, the present invention offers a power saving advantage. If mobile station 28 is hearing an edge AP, then a full association does not occur and, hence, less power is used. For example, in some embodiments, mobile station 28 may only wake-up periodically to listen to 802.11 advertisements. Thus, beacons (or whatever signal) can be listened to, whereby mobile station 28 does not attempt to associate with any AP, or to transmit any data under certain conditions.

Note that communication system 10 can also be used to collect statistics relating to where handoffs occur such that designations or determinations could be made for portal APs. As identified above, these designations could be made manually. However, in other embodiments, these designations could be performed dynamically. Thus, a program or an algorithm could be used to automatically determine optimal portal APs, as opposed to delegating this task to a person, whose results may not reflect the best selection of portal APs.

Note that while the preceding examples include specific functional components for mobile station 28, mobile station 28 may include any collection and arrangement of components, including some or all of the enumerated functional components, for communicating with remote devices using cellular network 12 and/or enterprise network 14 and effecting a handoff between cellular network 12 and enterprise network 14. Moreover, mobile station 28 contemplates implementing each of the functional components using any suitable combination and arrangement of hardware and/or logic. Thus, in one embodiment mobile station 28 is a mobile phone. In other embodiments, mobile station 28 may be a personal digital assistant (PDA), any type of telephone, an electronic notebook, a laptop computer, or any other device operable to establish communications with cellular network 12 and enterprise network 14.

The preceding discussions illustrate particular methods for effecting handoff between cellular network 12 and enterprise network 14 and for providing appropriate handoff decision support. However, these discussions illustrate only exemplary methods of operation. While discussions often focus on handoff in the enterprise-to-cellular direction, similar techniques may be used to provide for handoff decision support in the cellular-to-enterprise direction. Furthermore, communication system 10 contemplates devices using any suitable techniques, elements, and applications for performing these functions. Thus, many of the steps in the discussions may take place simultaneously and/or in different orders than as shown. In addition, the devices may use methods with additional steps or fewer steps, so long as the methods remain appropriate. Moreover, other devices of communication system 10 may perform similar techniques to support handoff decisions associated with cellular network 12 and enterprise network 14.

It is critical to note that the stages and steps in the FIGURES illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing suitable decision support functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of gateway 22 could be supplanted by bridges, switches, routers or any other suitable devices that are conducive to network communications. In addition, the use of the 802.11 and/or beacons reflect example signaling protocols. These protocols can be supplanted with any other signaling channel that is available in the cellular or PSTN network.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for communicating in a wireless network environment, comprising:

a mobile station operable to receive signaling from one or more access points, which may transmit information to the mobile station to be used in order to execute a handoff from an enterprise network to a cellular network or from the cellular network to the enterprise network, wherein the mobile station is operable to enter into one or more power save operations after receiving the information, whereby the mobile station actively scans for the access points, wherein the access points are edge access points and portal access points both of which transmit beacons, which represent periodic transmissions, to the mobile station to trigger the handoff and to trigger the power save operations.

2. The apparatus of claim 1, wherein the information is provided in one or more probe responses that are communicated to the mobile station.

3. The apparatus of claim 1, wherein the mobile station is operable to interface with a wireless local access network (WLAN) management module that facilitates the handoff.

4. The apparatus of claim 3, wherein the WLAN management module includes information associated with locations of one or more of the access points.

5. The apparatus of claim 1, wherein one or more of the access points are portal access points that are manually configured.

6. The apparatus of claim 1, wherein one or more of the access points are dynamically delegated using collected statistics associated with one or more of the access points.

7. A method for communicating in a wireless network environment, comprising:
   receiving signaling from one or more access points, which may transmit information to a mobile station; and
   using the information to execute a handoff from an enterprise network to a cellular network or from the cellular network to the enterprise network, wherein the mobile station is operable to enter into one or more power save operations after receiving the information, whereby the mobile station actively scans for the access points, wherein the access points are edge access points and portal access points both of which transmit beacons, which represent periodic transmissions, to the mobile station to trigger the handoff and to trigger the power save operations.

8. The method of claim 7, wherein the information is provided in one or more probe responses that are communicated to the mobile station.

9. The method of claim 7, further comprising:
   interfacing with a wireless local access network (WLAN) management module that facilitates the handoff.

10. The method of claim 9, wherein the WLAN management module includes information associated with locations of one or more of the access points.

11. The method of claim 7, further comprising:
   registering with the cellular network after receiving the information.

12. The method of claim 7, further comprising:
   associating with a portal access point after receiving the information; and
   monitoring signal strength such that when the signal strength drops below a given threshold, then the mobile station opts to register with the cellular network.

13. Software for communicating in a wireless network environment, the software being embodied in a computer readable medium and comprising computer code such that when executed is operable to:
   receive signaling from one or more access points, which may transmit information to a mobile station; and
   use the information to execute a handoff from an enterprise network to a cellular network or from the cellular network to the enterprise network, wherein the mobile station is operable to enter into one or more power save operations after receiving the information, whereby the mobile station actively scans for the access points, wherein the access points are edge access points and portal access points both of which transmit beacons, which represent periodic transmissions, to the mobile station to trigger the handoff and to trigger the power save operations.

14. The medium of claim 13, wherein the information is provided in one or more probe responses that are communicated to the mobile station.

15. The medium of claim 13, wherein the code is further operable to:
   interface with a wireless local access network (WLAN) management module that facilitates the handoff.

16. The medium of claim 13, wherein the code is further operable to:
   register with the cellular network after receiving the information.

17. The medium of claim 13, wherein the code is further operable to:
   associate with a portal access point after receiving the information; and
   monitor signal strength such that when the signal strength drops below a given threshold, then the mobile station opts to register with the cellular network.

* * * * *